United States Patent [19]

Becker et al.

[11] Patent Number: 5,504,063
[45] Date of Patent: Apr. 2, 1996

[54] ASPHALTENE REMOVAL COMPOSITION AND METHOD

[75] Inventors: Harold L. Becker, Tomball; Bernhard W. Wolf, Houston, both of Tex.

[73] Assignee: Petrolite Corporation, St. Louis, Mo.

[21] Appl. No.: 272,550

[22] Filed: Jul. 11, 1994

Related U.S. Application Data

[63] Continuation of Ser. No. 25,892, Mar. 3, 1993, abandoned, which is a continuation of Ser. No. 620,988, Nov. 30, 1990, abandoned.

[51] Int. Cl.$^6$ ..................................................... C09K 7/00
[52] U.S. Cl. ........................ 507/243; 507/236; 507/237; 134/40; 166/304; 166/311
[58] Field of Search ..................... 252/8.552; 507/236, 507/237, 243; 134/40; 166/304, 311

[56] References Cited

U.S. PATENT DOCUMENTS

| | | | |
|---|---|---|---|
| 2,356,254 | 8/1944 | Lehmann, Jr. et al. | 252/8.55 |
| 2,708,481 | 5/1955 | Allen | 166/9 |
| 2,766,132 | 10/1956 | Blair et al. | 106/273 |
| 2,873,253 | 2/1959 | Stanphill | 252/8.552 |
| 2,970,958 | 2/1961 | Shapiro | 252/8.55 |
| 3,402,770 | 9/1968 | Messenger | 507/90 |
| 3,531,409 | 9/1970 | Seffens et al. | 252/8.55 |
| 3,654,993 | 4/1972 | Smith et al. | 252/8.555 X |
| 3,874,452 | 4/1975 | Allen et al. | 166/260 |
| 3,910,351 | 10/1975 | Wu et al. | 166/276 |
| 3,914,132 | 10/1975 | Sutton | 134/40 |
| 3,951,210 | 4/1976 | Wu et al. | 166/288 |
| 3,954,761 | 5/1976 | Redmore | 252/8.555 X |
| 3,979,323 | 9/1976 | Spahr et al. | 252/311.5 |
| 4,090,562 | 5/1978 | Maly et al. | 166/304 |
| 4,125,458 | 11/1978 | Bushnell et al. | 208/309 |
| 4,207,193 | 6/1980 | Ford et al. | 252/8.55 B |
| 4,338,136 | 7/1982 | Goullet et al. | 252/311.5 X |
| 4,339,349 | 7/1982 | Martin et al. | 252/8.555 X |
| 4,370,174 | 1/1983 | Braithwaite, Jr. | 134/7 |
| 4,502,861 | 3/1985 | Becker et al. | 252/8.8 X |
| 4,664,721 | 5/1987 | Valasek | 134/26 |
| 4,676,834 | 6/1987 | Treybig | 106/14.15 |
| 5,027,901 | 7/1991 | French et al. | 166/310 |
| 5,064,571 | 11/1991 | Speranza et al. | 252/357 |
| 5,093,031 | 3/1992 | Login et al. | 252/357 |
| 5,112,505 | 5/1992 | Jacobs et al. | 252/8.552 |

OTHER PUBLICATIONS

Kirk–Othmer Encyclopedia of Chemical Technology, vol. 7, (1979), pp. 583–584 Diamines and Higher Amines, Aliphatic.
Kirk–Othmer Encyclopedia of Chemical Technology, vol. 11 (1979), p. 263 Formic Acid and Derivatives (DMF).
Kirk–Othmer Encyclopedia of Chemical Technology, vol. 7, (1979), pp. 595–596 Diamines and Higher Amines, Aliphatic.
Journal of the American Chemical Society, 98:2, (Jan. 21, 1976), pp. 377–383 The Solvatochromic Comparison Method I. The B–Scale of Solvent Hydrogen–Bond Acceptor (HBA) Basicities, Mortimer J. Kamlet and R. W. Taft.
Journal of the American Chemical Society, 99:18, (Aug. 31, 1977), pp. 6027–6038 The Solvatochromic Comparison Method 6. The * Scale of Solvent Polarities. Mortimer J. Kamlet, José Luis Abboud, and R. W. Taft.
Prog. Phys. Org. Chem., vol. 81, pp. 485–630, An Examination of Linear Solvation Energy Relationships, M. J. Kamlet, J. L. M. Abboud, and R. W. Taft.

Primary Examiner—Gary Geist
Assistant Examiner—Valerie Fee
Attorney, Agent, or Firm—Kenneth Solomon

[57] ABSTRACT

An asphaltene removal composition comprising an alkyleneamine-fatty acid condensation reaction product and one or more polar aprotic high dielectric constant solvents is useful for removing and inhibiting asphaltene deposits from wells, pipelines and associated equipment.

37 Claims, 6 Drawing Sheets

5,504,063

ASPHALTENE REMOVAL COMPOSITION AND METHOD

This application is a continuation of U.S. Ser. No. 08/025,892, filed Mar. 3, 1993, now abandoned which is a continuation of Ser. No. 07/620,988, filed Nov. 30, 1990, now abandoned.

FIELD OF THE INVENTION

The invention relates to compositions of matter and to methods for removing asphaltene deposits from wellbores and adjacent subterranean formations and production equipment and pipelines.

SETTING OF THE INVENTION

Asphaltene deposits in near wellbore subterranean formations, in well tubing and perforations, and in transfer lines, storage tanks, surface equipment, and pipelines hinder production and transport of high asphaltenic crudes from wells. Various compositions and treatments have been proposed and used for removing these deposits, but new treatments are needed; especially treatments which are inexpensive, easy to use, and effective.

Asphaltenes are complex heteroatomic polar macrocyclic compounds containing carbon, hydrogen, sulfur and oxygen occurring in crude oils. Resin and maltene precursors of the asphaltenes act as peptizing agents in virgin crude oils to stabilize a dispersion of micelles. When mechanical or chemical forces become sufficiently great, these stabilizing species are lost and the destabilized asphaltenes become susceptible to interaction and aggregation resulting in deposition of asphaltene macro-particles.

Xylene, toluene or other aromatic solvents have been used for many years for the removal of asphaltenes, but require large amounts of solvent and high frequency of treatment. Other solvents for asphaltenes include primary, secondary and tertiary amines, certain imidazolines, as well as carbon disulfides, pyridines, nitrobenzene, quinoline, and the like. See, for example, U.S. Pat. Nos. 3,914,132; 2,970,958; and 2,766,132.

Also, it is mentioned that it is known to use N-methyl pyrrolidinone (NMP) (also referred to as N-Methyl pyrrolidone) or furfural to precipitate asphaltic material from the bituminous petroleum portion of formation petroleum; and also known to use NMP for deasphalting an asphalt containing mineral oil.

Described below beginning with the Summary of the Invention is a composition of matter and various methods for removing asphaltene deposits from wellbores and equipment. Because the prior art known to Applicants did not disclose the effective composition of matter or its uses hereinafter described for asphaltene removal, the composition was discovered by empirical investigation. The composition of matter and its uses hereinafter described greatly enhance removal of asphaltene deposits. Moreover, each active component in the preferred composition significantly enhances the action of the other components.

SUMMARY OF THE INVENTION

The invention relates to an asphaltene removal composition and to methods for removing asphaltene deposits from wellbores and adjacent subterranean formations and from production equipment and systems. Small amounts of the asphaltene removal composition peptizes or liquefies deposited asphaltenes, reducing the size of the average particle and forming a stable suspension which can be readily removed from deposit restricted areas.

According to an aspect, the composition comprises a component A including an effective amount of alkylene fatty acid condensation reaction products (AACP) admixed with component B, an effective amount of polar aprotic high dielectric constant solvent, and optionally an effective carrier fluid for introducing the composition into contact with asphaltene deposits.

According to an aspect, component A of the composition comprises an effective amount of N-substituted imidazolines (NSI) reaction products of $C_8$ to $C_{32}$ fatty acids with polyalkylenepolyamines.

According to an aspect, component B comprises an effective tertiary amine having a nitrogen moiety adjacent one of a carbonyl or phosphoryl moiety.

According to an aspect, component B comprises one or more solvents characterized by high Pi* and Beta as hereinafter described.

According to another aspect, the composition comprises 1 to 5 LV % (liquid volume percent) AACP or NSI, 0.2 to 2 LV % (up to 50 LV %) of 2-methyl N-pyrrolidinone (NMP) and 1 to 5 LV % (up to 50 wt %) of dimethylformamide (DMF).

According to method aspects, the invention comprises introducing the invented composition into contact with deposited asphaltenes under conditions and for a time effective to disperse at least a portion of the deposited asphaltenes.

BRIEF DESCRIPTIONS OF THE DRAWINGS

DETAILED DESCRIPTION OF THE INVENTION

Figure 1A:
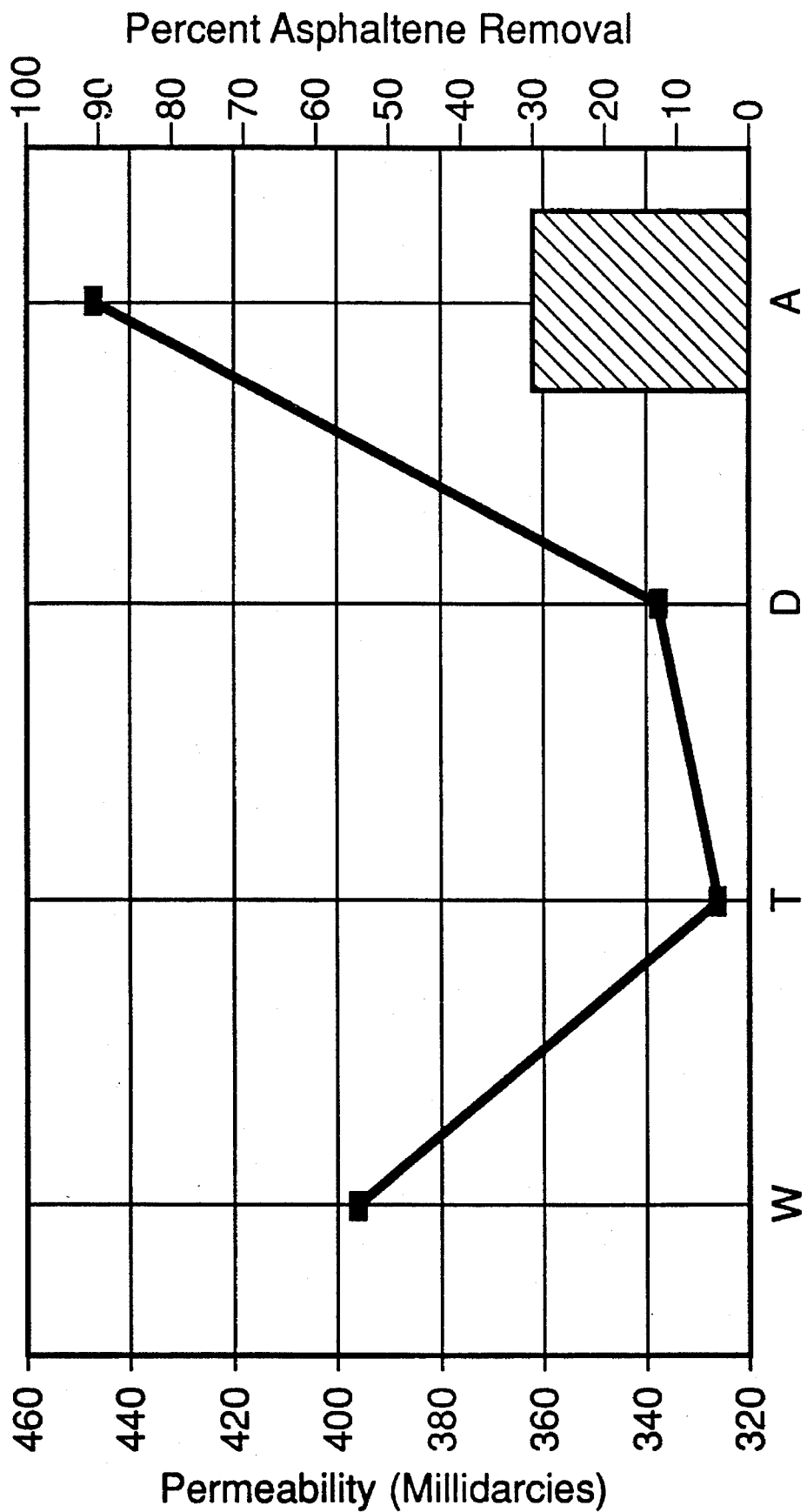
FIGS. 1A, 1B and 1C illustrate results of runs using various dispersant systems on cores having Teco, Nipisi and Wertz asphaltene, respectively, deposited thereon.

The invention relates to asphaltene removal compositions and to methods for removing asphaltenes from wells and casing, from adjacent subterranean formation and from production and pipelining equipment.

The composition comprises an effective alkyleneamine-fatty acid condensation product (AACP) or N-substituted imidazoline (NSI) and an effective polar aprotic high dielectric constant, preferably tertiary amine, solvent optionally in a hydrocarbon carrier.

The polar aprotic high dielectric constant tertiary amine solvent is one or preferably a mixture of solvents selected from the group of tertiary amine compounds comprising the moiety

where X is carbon or phosphorous, i.e., comprising carbonyl or phosphoryl moieties.

Preferably the tertiary amine solvent is selected from carbonyl compounds as may be represented by

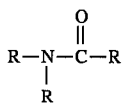

wherein each R represents hydrogen or a $C_1$ through $C_6$ alkyl moiety and optionally wherein two or more R groups are united in form of an aliphatic ring or cyclic structure.

Illustrative solvents include methyl formamide, dimethyl formamide (DMF), diethyl formamide, dipropyl formamide, butyrolactam, N-methyl-2-pyrrolidinone (NMP), hexamethyl phosphoramide (HMP) and the like.

Thus, the solvent of the invention should have a dielectric constant at least about as high as the dielectric constants of such solvents. Because the lowest dielectric constant of those solvents is about 23.5, the solvent of the invention should have a dielectric constant of at least about 23.5. See also EXAMPLE VI below and HMP are The structures of DMF, NMP and HMP are as follows:

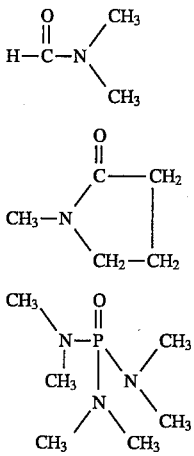

The alkyleneamine-fatty acid condensation reaction products (AACP) are products produced by condensation of fatty acids or fatty acid derivatives with alkyleneamines. Both the reactions and the products thereof are well known to those skilled in the art.

According to the invention, the fatty acids are preferably monocarboxylic fatty acids having 8 to 32 carbon atoms.

The alkyleneamines are preferably of the formula

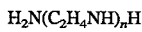

where n is in the range of 1 to 10, preferably 1 to 5. Illustrative alkyleneamines are ethylene diamine (EDA), diethylene triamine (DETA), triethylene tetramine (TETA), tetraethylene pentamine (TEPA) and the like.

The reaction products can be illustrated by reaction products of ethylenediamine and its homologs which react when heated with an excess of monobasic carboxylic acid to yield mono- and substituted amides which undergo further condensation to yield cyclic 2-substituted imidazoline derivatives. The reaction of polyalkylenepolyamines with fatty acids or fatty acid derivatives yields complex mixtures of amine salts, amides, and 2- and 1,2-substituted imidazolines.

Such reactions and reaction products are well known to those skilled in the art and require no further description here. See, for example, Kirk Othmer, Encyclopedia of Chemical Technology, Vol. 7, pp. 583–584 (1981).

The effective hydrocarbon carrier fluid preferably comprises aromatic solvents such as benzene, toluene, xylene and the like, alone, mixed, or in combination with well treating solvents. Hydrocarbon or mutual solvents can be used, for example, aromatic solvents admixed with various alcohols such as methanol, isopropyl alcohol, capryl alcohol, ethylhexyl alcohol, octyl alcohols, and the like. Xylene and toluene are preferred aromatic solvents.

The relative amounts of carrier fluid and invented compositions can vary over a wide range. The carrier fluid can comprise predominantly all of a treating fluid since any addition of invented composition can enhance asphaltene removal. Conversely, the treating fluid can be used neat if desired. Hence, the invented composition can be present in amounts from less than 1 LV % to all of a treating fluid, and the carrier fluid can comprise from 0 to 99+LV %.

Each of the components of the invented composition can be present in a treating solution as described below.

The alkyleneamine fatty acid condensation products (AACP) or N-substituted imidazolines (NSI) are present in a treating fluid at least in amounts effective for enhancing dissolution of deposited asphaltenes as compared to dissolution of asphaltenes in xylene alone. The upper limits are determined by economic factors, i.e., there is no incentive to use amounts greater than required for an effective application. Generally, the AACP and NSI can range from 1 to 50 LV % of the treating solution, preferably from 1 to 15 LV %, most preferably from 1 to 10 LV %. 5 LV % AACP or NSI have proven to be an effective low cost asphaltene solvent.

The polar aprotic high dielectric constant preferably tertiary amine solvent is present in a treating fluid at least in amounts effective for physically disrupting accumulations of asphaltenes. The upper limit of presence is again determined by economic and effectiveness considerations. Generally, the polar aprotic solvent can be present in an amount in the range of 0.1 to about 50 LV %, preferably in the range of 0.1 to about 15 LV %, most preferably in an amount in the range of about 0.2 to 10 LV %.

According to a preferred aspect of the invention, the effective tertiary amine solvent can comprise a mixture of two or more such solvents with AACP or NSI. Thus, a mixture of DMF and NMP significantly improves results as compared with results using such components separately or in various combinations of two components. See EXAMPLE VII and EXAMPLE VIII below. According to this aspect of the invention, the asphalt removal composition can comprise in the range of 0.1 to 5 LV % of each of AACP, NMP and DMF; the remainder being carrier fluid.

Preferably such a three-component mixture comprises from 1 to 5 LV % DMF, from 0.2 to 2.0 LV % NMP, and from 1 to 5 LV % AACP since such a three-component mixture in carrier is indicated to be highly and synergistically effective in asphaltene removal.

The invention will be further understood and appreciated from the following discussion and examples.

Asphaltene samples are collected from areas where asphaltene deposits represent a problem in oil production. Uniformly compressed pellets about 4 grams in weight and uniform in size and surface area are formed by placing asphaltene samples in a pellet press and pellets are formed at 20,000 pounds per square inch pressure. The pellets are treated as discussed below. Hexane when used is used to prevent solvent interference with results since hexane and lower alkanes are generally ineffective in suspending asphaltenes.

EXAMPLE 1 SCREENING RUNS

Solvents and dispersants as set out in Tables IA and IB below are evaluated for asphaltene suspending effectiveness. Pellets are observed for 24 hours, and relative effects such as pellet disruption, change in coloration of hexane solvent and filtration rates of supernatant are observed and noted.

TABLE IA

| Dispersant System | Disruption | Coloration | Filtration |
|---|---|---|---|
| 1 | Poor | Poor | Slow |
| 2 | Poor | Poor | Slow |
| 3 | Poor | Poor | Slow |
| 4 | Poor | Poor | Slow |
| 5 | Poor | Poor | Slow |
| 6 | Poor | Poor | Slow |
| 7 | Poor | Poor | Slow |
| 8 | Poor | Poor | Slow |
| 9 | Poor | Moderate | Slow |
| 10 | Fair | Good | Moderate |
| 11 | Fair | Good | Moderate |
| 12 | Excellent | Excellent | Moderate |
| 13 | Excellent | Good | Fast |
| 14 | Excellent | Very Good | Fast |
| 15 | Very Good | Excellent | Fast |

The dispersant systems are described in Table 1B:

TABLE IB

1. Nitrobenzene
2. Acetone
3. Nonylphenol + 10 mole ethylene oxide
4. Dodecylbenzene sulfonic acid ammonium salt
5. Ditertiary butyl peroxide
6. Sorbitan monooleate
7. Dipropylene glycol + 20 mole propylene oxide
8. Zinc stearate
9. Alkyl pyridine
10. Dodecylbenzene sulfonic acid
11. Mixed alkylsulfonates
12. N-methyl 2-pyrolidinone
13. Dimethyl formamide
14. AACP 1
15. AACP 2

AACP1 and AACP2 are reaction products in different proportions of diethylene triamine with tall oil.

EXAMPLE II—DISPERSION RUNS

Based on the results of EXAMPLE I, the dispersant systems described in Table IIA below are selected for further evaluation and are evaluated in hexane as in Example I. The relative results are set out in Table IIB below.

TABLE IIA

| Dispersant System | |
|---|---|
| A | mixture of 5 LV % DMF, 2 LV % NMP, and 5 LV % fatty acid - diethylenetriamine condensation reaction product |
| B | aromatic distillates (naphtha) |
| C | 30% dodecylbenzene sulfonic acid in toluene |
| D | mixture of 20% xylene, 50.9% isopropyl alcohol, 9.1% octyl alcohol, and 20% methanol |

TABLE IIB

| Dispersant System | Disruption | Coloration | Filtration |
|---|---|---|---|
| A | Excellent | Excellent | Very fast |
| B | Poor | Fair | Slow |
| C | Fair | Good | Moderate |
| D | Fair | Poor | Slow |

EXAMPLE III—DISPERSION RUNS

These runs are conducted under static conditions with the object of determining the capacity of certain dispersant systems for dispersing and maintaining dispersed asphaltenes.

The equipment used in these runs consist of graduated cylinders or bottles of 25 ml, a balance for weighing asphaltene, pipettes for measuring volumes of different products, and various dispersant systems to be tested.

1 g of asphaltene is weighed (2.5 g for runs with aromatics) and is placed into a graduated cylinder or test bottle, 20 ml of hexane or 22.5 ml or 23.7 ml of toluene or xylene. 5 ml of dispersant systems such as identified below is added to hexane; or 2.5 ml is added to aromatics for 10% runs and 1.75 ml is added to aromatics for 5% runs. The system is allowed to stand under quiescent conditions for 24 hrs (4 hrs during runs with aromatics). Changes in color with time are observed at the end of the indicated period and 2 ml of fluid with asphaltene dispersed are removed with a pipette a centimeter above the asphaltene to measure its concentration. The concentration of asphaltenes in hexane or aromatics is determined by means of Comparisons of transmittance applying Beer's Law or by gravimetric means weighing residual precipitate after drying 1 ml of removed fluid.

Results With Hexane

Hexane is used to eliminate any effect which the solvent may have on dispersing asphaltenes and to demonstrate the dispersing effect of a dispersant system alone. The results using comparisons of transmittancy applying Beer's Law are given in the following table.

TABLE IIIA

Tests of Dispersion with Hexane

| Dispersant System | % Transmittance | % Asphaltene Dispersed |
|---|---|---|
| E | 88.4 | 0.000175 |
| F | 47.7 | 0.001750 |
| G | 35.2 | 0.140000 |
| H | 8.3 | 0.735000 |
| I | 4.5 | 1.172500 |
| J | 3.1 | 1.312500 |

These dispersant systems have the compositions indicated in the following table.

TABLE IIIB

| Dispersant System | Composition |
|---|---|
| E | |
| F | Aromatic distillates (Naptha) |
| G | Mixture 5% Dimethyl formamide, 5% AACP 1, 2% NMP and 87% system D, (TABLE IIB) |
| H | Alkyl sulfonate in aromatic distillates |
| I | 5% DMF, 5% AACP 1, 2% NMP, and 88% Xylene |
| J | 5% DMF, 5% AACP 1, 2% NMP, 10% Formula D (TABLE IIB), 78% xylene |

As can be observed, dispersant systems I and J have the greatest efficacy for dispersing asphaltenes in hexane. Dispersant system I begins to color the hexane immediately upon addition.

Results With Aromatics

In these runs toluene and xylene are used as solvents and upon entry into contact with asphaltenes are immediately darkened in color indicating asphaltene-dispersion effects. The effect of the dispersant system is measured in percent of asphaltene in solution in pipetted solvent, dried and weighed or measured by transmittance. In Run 1, the effects of concentration of the products and differences between toluene and xylene are determined. In Run 2, various treatments are conducted in duplicate. The results obtained are shown in the following Table IIIC.

TABLE IIIC

| Dispersant System | % | Solvent | % Transmittance | In Solution Determined (Trans.) | (Wt.) |
|---|---|---|---|---|---|
| Run 1 | | | | | |
| I | 5 | Toluene | 1.8 | 40 | 28.2 |
| I | 10 | Toluene | 1.3 | 48 | 35.1 |
| J | 5 | Toluene | 1.4 | 46 | 12.9 |
| J | 10 | Toluene | 1.4 | 46 | 34.4 |
| I | 5 | Xylene | 5.1 | 30 | 24.3 |
| I | 10 | Xylene | 1.3 | 48 | 23.7 |
| J | 5 | Xylene | 2.8 | 29 | 29.9 |
| J | 10 | Xylene | 2.3 | 34 | 30.3 |
| Toluene | | | 14.7 | 0.24 | 18.7 |
| Xylene | | | 18.0 | 0.2 | 20.5 |
| Run 2 | | | | | |
| I | 5 | Toluene | 1.8 | 40 | |
| I | 5 | Toluene | 1.7 | 41 | |
| J | 5 | Toluene | 0.5 | 64 | |
| J | 5 | Toluene | 0.8 | 54 | |
| I | 5 | Xylene | 2.1 | 40 | |
| I | 5 | Xylene | 2.3 | 34 | |
| J | 5 | Xylene | 1.5 | 48 | |
| J | 5 | Xylene | 1.1 | 50 | |

As can be observed, the combination of toluene with dispersant system J is the most efficient in dispersing asphaltenes.

EXAMPLE IV—CORE RUNS

Runs are conducted using core samples to determine (1) asphaltene removal efficiency of various dispersant systems, and (2) effects of treatments using various dispersant systems on permeability.

A Hastier core holder (available from Temco Corporation, Tulsa, Oklahoma) for receiving a core for treatment is equipped with a pressure transducer for monitoring fluid pressure on the inlet side of the core holder and adapted with a high pressure liquid chromatography pump for flowing xylene or a treating solution through the core. Fluid passed through the core is provided to a colorimeter with a flow-through cell. Fluid pressure from the transducer and transmittance/absorbance are recorded.

Berea cores having in the range of 100 to 300 mD (millidarcies) absolute permeability are used. After establishing a water-wet condition using a brine solution having a composition as shown in Table VID below, and determining the effective initial permeability of core using xylene, asphaltene plugging damage is simulated by loading 75 milliliters of a 1% dispersion of asphaltene to the core, reducing permeability generally by 100 to 200 mD. A core is used repeatedly during a series of runs; consequently, initial permeability in a series of runs does not represent native state permeability. After loading asphaltene on the core, several core-volumes of xylene are passed through the core to establish a steady state condition followed by treating with various asphaltene dispersant systems as described below.

To determine effectiveness of dispersant systems in removing deposited asphalt from core, transmission at 430 nm of fluid flowed through the core is monitored by colorimeter. Accuracy of colorimeter readings is assured by comparing measurements made on core effluent to measurements obtained from standard dilutions of asphaltene dispersions in xylene.

To examine permeability effects, asphaltenes are loaded on the core and permeability effects are observed via pressure readings and flow rates; then, a dispersant system is added and the effects on permeability are again observed via measured pressure readings and flow rates.

Figure 1B:
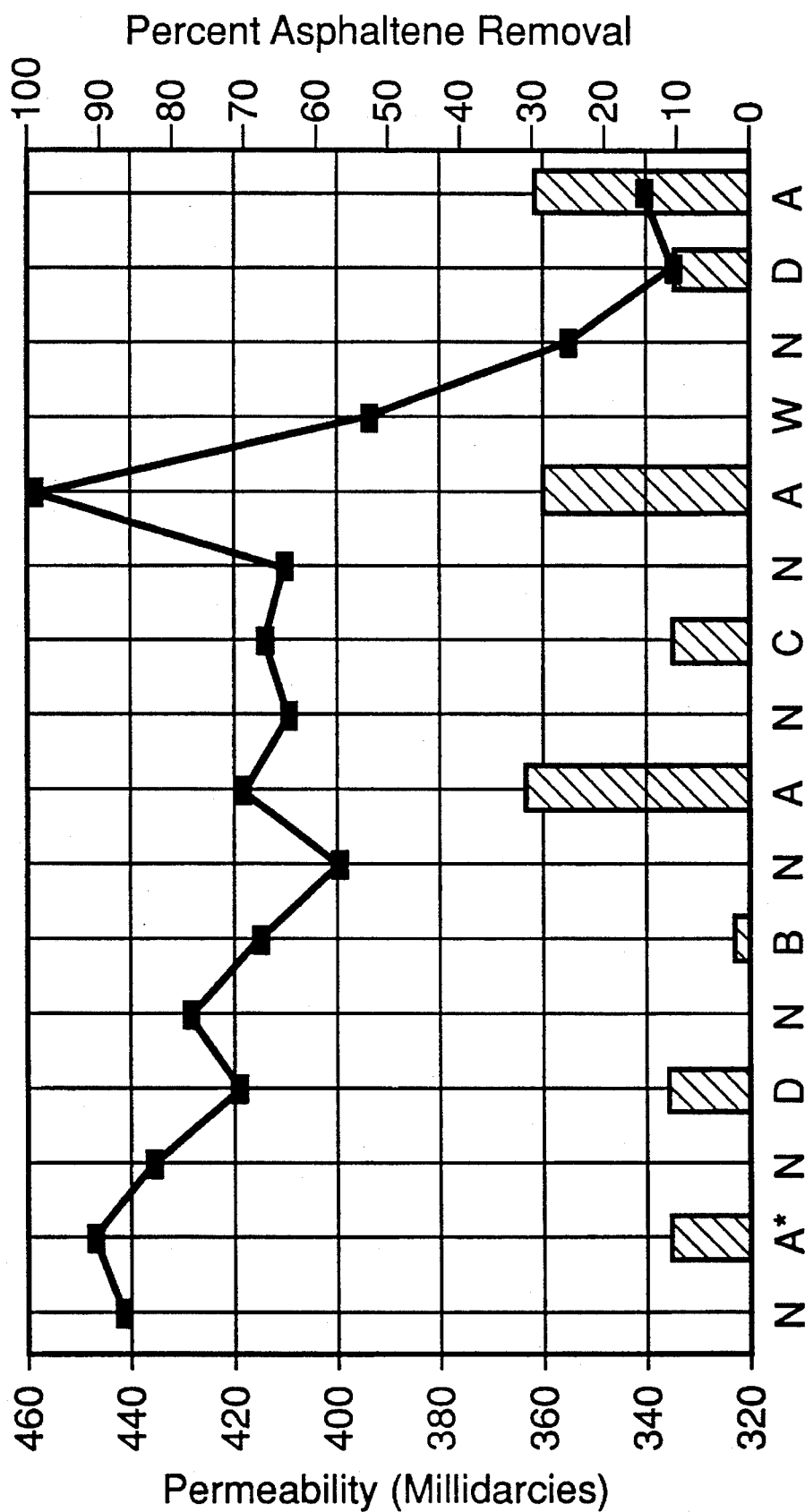
Figure 1C:
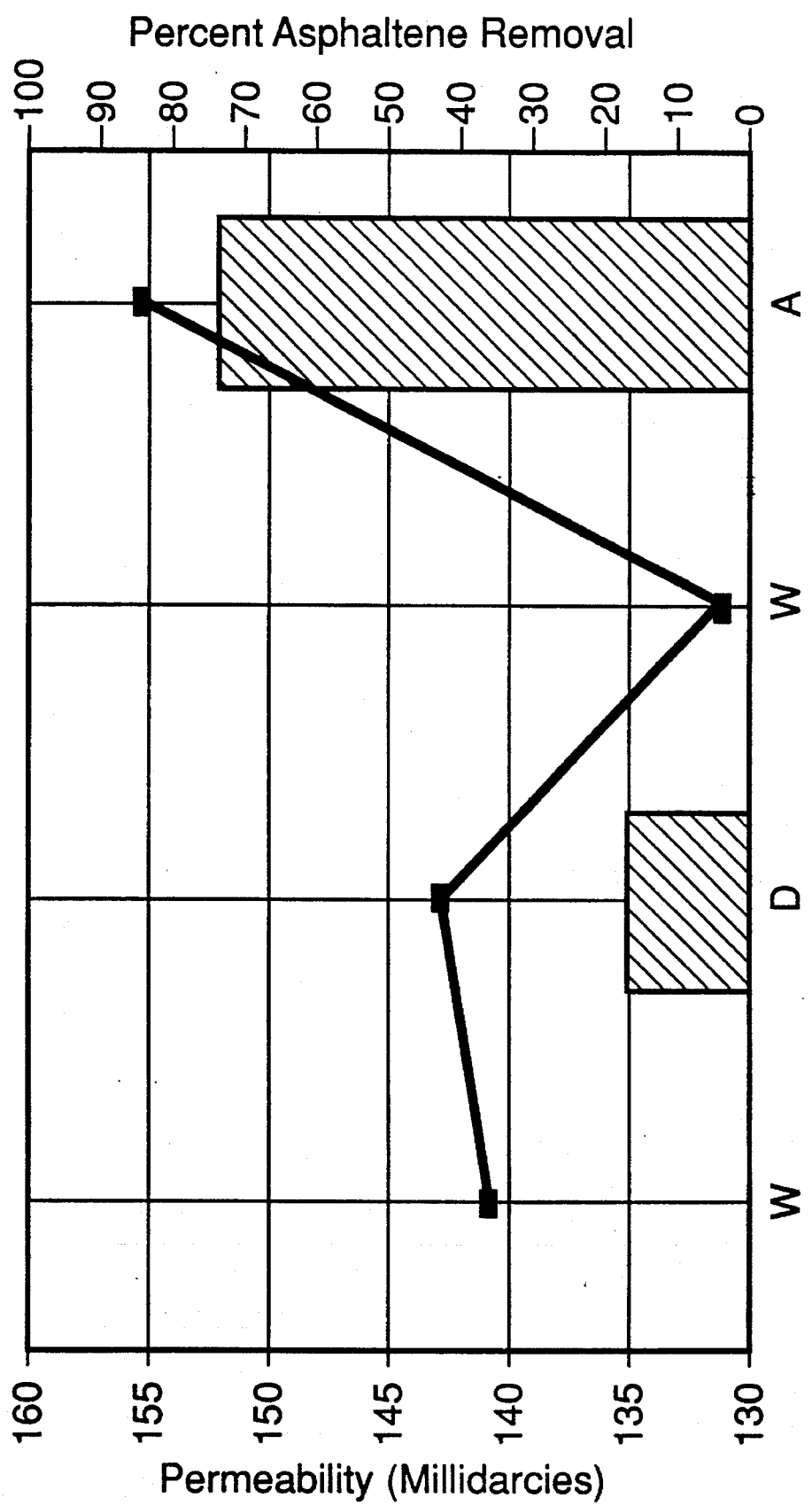

The results are set out in FIGS. 1A, 1B, and 1C. In these figures, the reference letters have meaning as follows:

A*—treatment with dispersant fluid A at 6.6

A—treatment with dispersant fluid A

B—treatment with dispersant fluid B

C—treatment with dispersant fluid C

D—treatment with dispersant fluid D

H—treatment with water

T—deposition of Teco asphaltene

W—deposition of Wertz asphaltene

N—deposition of Nipisi asphaltene

As used herein, asphaltenes are named after the field of origin. Dispersant fluids A, B, C, D are described in Table IIA above.

Referring now to FIG. 1A, as indicated at H, initial permeability of the core to water prior to treating is about 395 mD. At T, Teco asphaltene is deposited on the core resulting in a reduction in permeability to about 325 mD. As indicated by D, treatment with 1 core volume of dispersant system D results in a small increase in permeability to about 337 mD. However, no removal of asphaltenes from the core is indicated. As indicated at A, treatment of the core using dispersant blend A results in an increase in permeability to about 443 mD and an asphaltene removal of about 31%.

These results indicate that composition A is more effective than blend D both for improving permeability in and for removing asphalt from Teco asphaltene deposited core.

Referring now to FIG. 1B, FIG. 1B illustrates changes in permeability and percent asphaltene removal from various dispersant system treatments of Nipisi asphaltene deposited core.

As indicated at N, depositing Nipisi asphaltene on the core resulted in pretreatment permeability of about 442 mD. Referring to treatments with dispersant system A, treatment of Nipisi asphaltene damaged core improved permeabilities in each instance, under some treatment sequences by as much as about 50 mD. Further, asphaltene removal by dispersant system A is typically at about the 30% removal level. Even treatment with fluid A* (fluid A at about the 6.6 LV % dilution level) achieved about 12% removal of asphaltenes. The level of Nipisi asphaltene removal by dispersant system A was consistently high and was significantly higher than for any of dispersant systems B, C or D.

Referring now to FIG. 1C, FIG. 1C illustrates changes in permeability and percent asphaltene removal by various dispersant system treatments of Wertz asphaltene deposited core.

As indicated at W, after deposition of Wertz asphaltene on the core, core permeability was about 141 mD. Treatment with dispersant system D, although having little effect on permeability (permeability increased about 2 mD), resulted in about 17% asphaltene removal. Further deposition of Wertz asphaltene reduced permeability to about 133 mD. Subsequent treatment with dispersant fluid A resulted in about a 22 mD improvement in permeability and in about a 74% asphaltene removal.

From FIGS. 1A, 1B and 1C it can be seen that dispersant fluid A significantly outperforms other dispersant fluids tested in asphaltene removal and in consistency of permeability improvement.

EXAMPLE V—CORE RUNS

By means of these runs the cleaning of formation rock in the vicinity of the well is simulated. The runs have as an objective the demonstration of the capacity of various dispersant systems for removing damage from formation rock caused by asphaltene deposits.

The equipment used in this test consists of a high pressure liquid chromatography pump with a regulator, a Hastler core holder (available from Temco Corporation, Tulsa, Okla.), an ultraviolet detector to measure transmittance of fluid as it leaves the core, and a recorder for measuring fluid pressure on the core and transmittance of effluent from the core.

In the Hastler core holder, a core (1.5 in. in diameter and 8.0 in. in length) is surrounded by a jacket permitting the application of pressure to flow fluids through the core. The direction of flow can be changed by valving to simulate squeeze treatments. By recording the transmittance and applying Beer's Law, the quantity of asphaltenes removed by various dispersant systems can be determined, and by recording the pressure a measure of the core permeability at various stages of the runs is obtained.

Runs With Previously Used Core

Xylene is pumped at 5 ml/min to establish baseline pressure and permeability measurements. The transmittance is calibrated with xylene to obtain a baseline of 100% transmittance. Seventy five ml of a solution containing 1% of Jujo asphaltene is pumped through the core to cause core damage. Then, xylene is pumped to remove asphaltene which has not been fixed on the core. Then, ml of dispersant system I at 100% or 50% is pumped through the core in a direction contrary to the flow with which one established the damage. Then, xylene is pumped until transmittance is constant.

Using the values of transmittance and Beer's Law, the cumulative percent of asphaltenes relative to asphaltene deposited on the core removed by the treatment is determined. The results are shown in Table VA at 100% and in Table VB at 50%.

TABLE VA

| ml Effluent | Percent Asphaltene Removed |
|---|---|
| 120 | 92.7 |
| 150 | 93.6 |
| 175 | 94.4 |
| 200 | 94.8 |
| 250 | 95.7 |
| 275 | 96.1 |
| 300 | 96.2 |
| 350 | 96.5 |
| 400 | 96.8 |
| 450 | 96.8 |
| 480 | 96.8 |

TABLE VB

| ml Effluent | Percent Asphaltene Removed |
|---|---|
| 30 | 49.8 |
| 75 | 50.8 |

TABLE VB-continued

| ml Effluent | Percent Asphaltene Removed |
|---|---|
| 120 | 50.5 |
| 150 | 52.5 |
| 200 | 56.0 |
| 260 | 70.0 |
| 320 | 74.0 |
| 340 | 75.0 |
| 390 | 77.0 |
| 405 | 77.8 |

Table VIA indicate that 100% solution removes about asphaltene and Table VIB indicate that 50% solution removes about 78% of the asphaltene.

The following Table VC shows different permeabilities during the test.

TABLE VC

| Dispersant System | Flow Rate (ml/sec) | Pressure (psi) | Permeability (mD) |
|---|---|---|---|
| Xylene | 0.083 | 16 | 95.52 |
| Asphaltene | 0.083 | 71 | 21.53 |
| I ≈ 100% | 0.083 | 57 | 26.18 |
| Asphaltene | 0.067 | 95 | 12.87 |
| I ≈ 50% | 0.083 | 67 | 22.81 |

Figure 2:
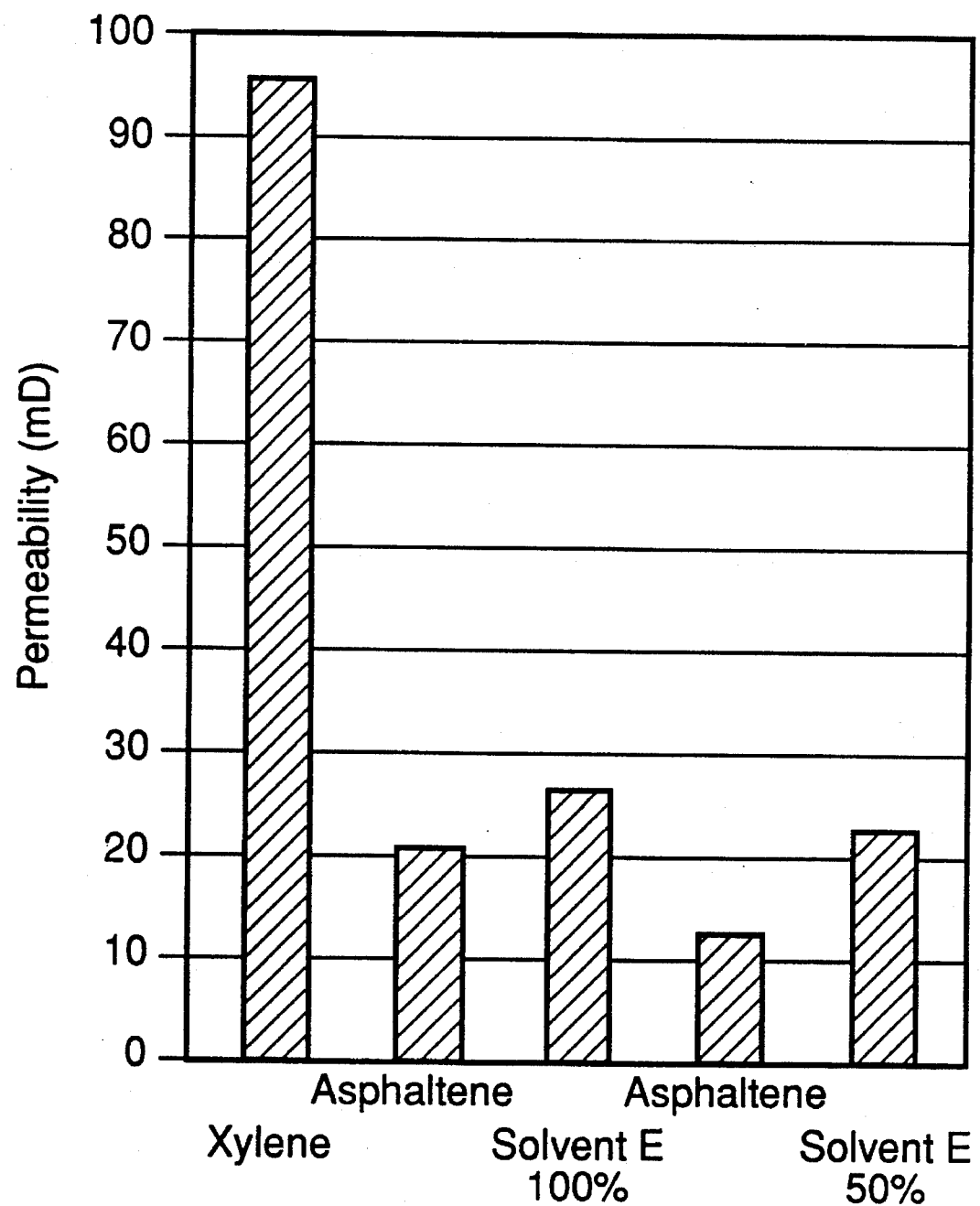
FIGS. 2, 3A and 3B illustrate effects of asphaltene deposits on core permeability and effects of treatment.

In FIG. 2, the permeabilities are compared during various steps of the runs. It can be seen that asphaltene treatments cause a reduction in permeability and that treatment with dispersant system I causes an increase in permeability supporting an inference that damage is caused by asphaltene particles being deposited in pore throats of the core and that the dispersant package removes a percentage of this damage. Enough damage is removed by the dispersant that a measurable improvement in permeability is obtained.

Runs with New Core

A new core is saturated with brine preliminary to tests using asphaltenes and asphaltene dispersant systems. The brine composition is as follows:

TABLE VD

| Brine Composition | |
|---|---|
| NaCl | 53.293 g/l |
| $CaCl_2$ | 6.163 g/l |
| $MgCl_2$ | 3.354 g/l |
| $BaCl_2$ | 0.064 g/l |
| $SrCl_2$ | 1.040 g/l |
| $Na(HCO_3)$ | 0.234 g/l |

As soon as the core is saturated with the brine, xylene is pumped through to establish a baseline of pressure and permeability without asphaltene damage. To cause asphaltene deposit damage to the core, xylene with asphaltenes is pumped through the core. Charges of 75 ml are used to cause asphaltene damage to the core. Then, xylene is pumped throughout the core to remove any asphaltenes which have not been deposited onto the core.

When the transmittance line begins to level out, one pumps in the same direction 60 ml of a solution of 25% of dispersant system D in xylene followed with 15 ml of dispersant system I to simulate a field squeeze application, then discontinues pumping and allows the solution to remain in contact with the asphaltene damaged core for 4 hrs. After 4 hrs, hexane is pumped through the core in the opposite direction to avoid any xylene effect in removing asphaltenes. This run is repeated using dispersant system J in place of system I.

Figure 3A:
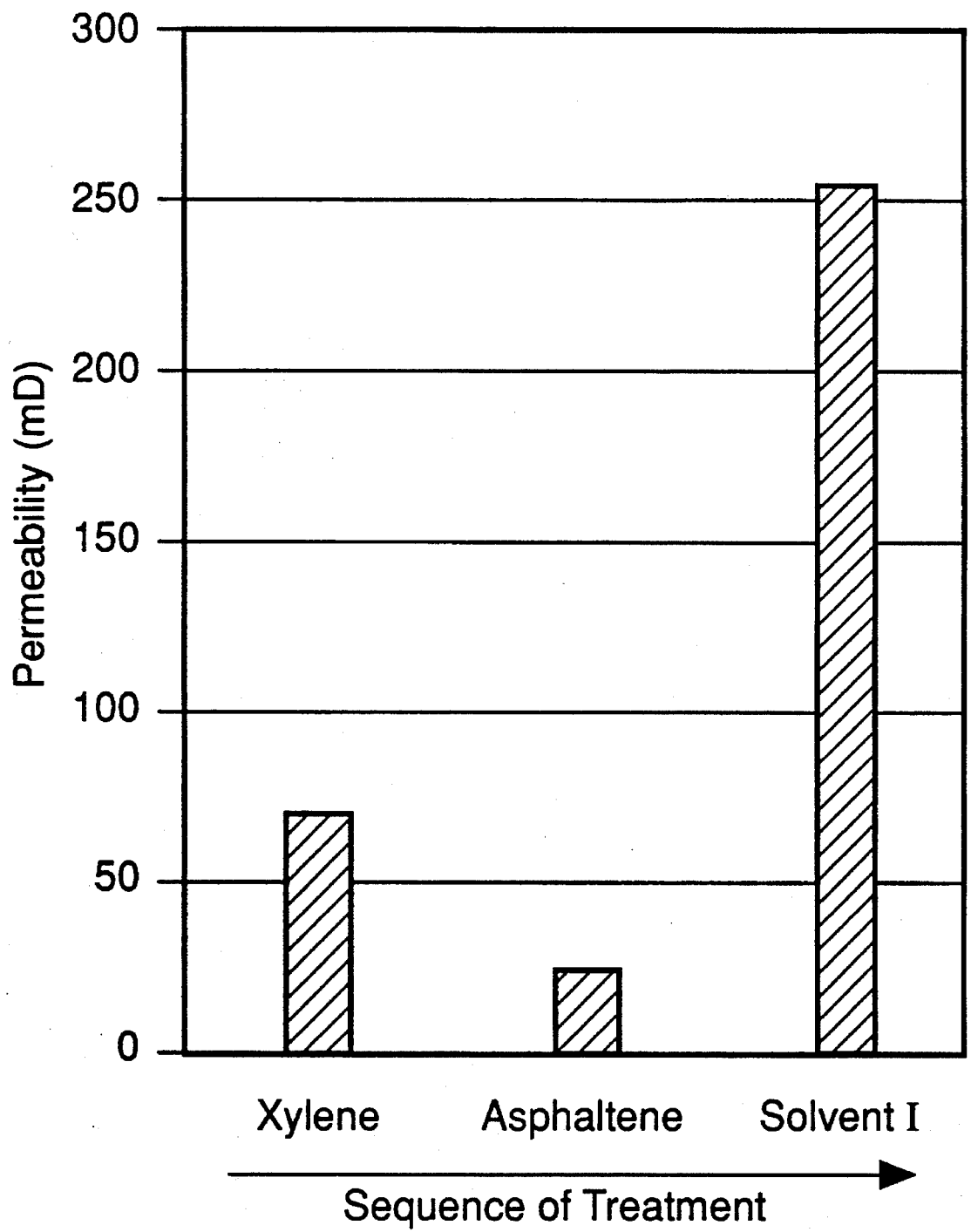
Figure 3B:
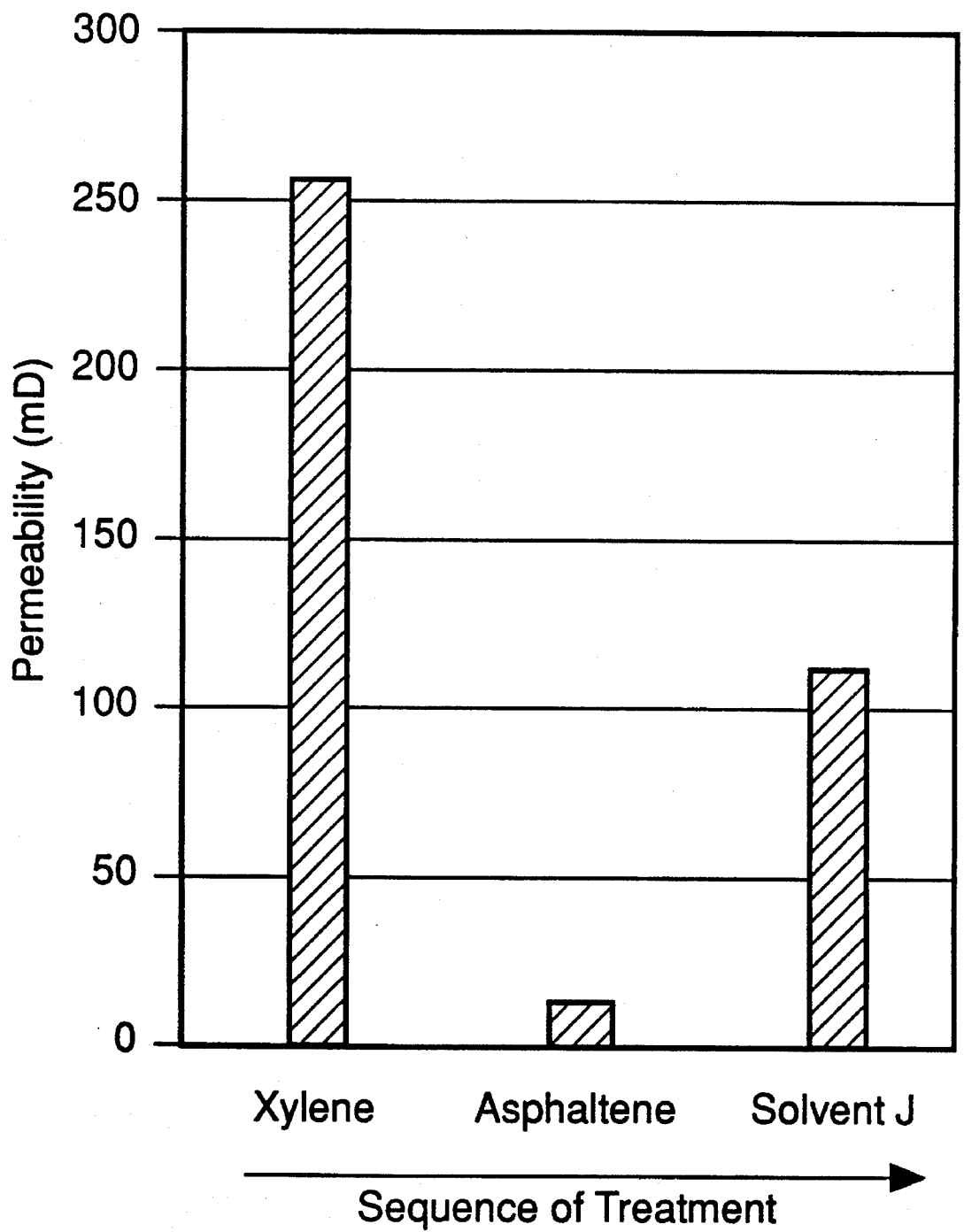

As indicated in FIGS. 3A and 3B and in Table VE, permeability of the core is improved significantly with the proposed treatment.

TABLE VE

| Treatment | Permeability (New Core) | | |
|---|---|---|---|
| | Q (ml/sec) | P (Atm.) | K × 1000 |
| First Run Series | | | |
| Xylene | 0.083 | 22 | 69.47 |
| Asphaltene | 0.083 | 65 | 23.51 |
| D/I | 0.083 | 6 | 254.72 |
| Second Run Series | | | |
| Xylene | 0.083 | 6 | 254.72 |
| Asphaltene | 0.083 | 130 | 11.76 |
| D/J | 0.083 | 14 | 109.17 |

Using D'Arcy's Law of Permeability, $$K = \frac{Q \mu L}{A \Delta P}$$

wherein:

K= Permeability, darcies
Q= Flow through sample (cc/sec or ml/sec)
L= Length of rock sample or core
μ= Fluid Viscosity, centipoise
A= Cross-sectional area perpendicular to flow, cm$^2$
ΔP= Pressure drop across rock sample, atmospheres It can be seen that asphaltene causes damage to the core by blocking the flow of fluids. As the fluid flow is hindered, the pressure increases and by Darcy's Law permeability is decreased. When the dispersant is squeezed into the core, allowed to remain in contact with the damage for a period of four hours, and flow resumed from the opposite side, a decrease in pressure follows. This decrease in pressure with matching flow rates represents an increase in permeability.

EXAMPLE VI—CORE RUNS—ADDITIONAL SOLVENTS

Core studies are conducted using the same method as described in Example IV with the solvents described below instead of DMF in dispersant fluid A. The purpose of this study is to investigate the effects of using solvents with differing Alpha, Beta, and Pi* values. See, for example, An Examination of Linear Solvation Energy Relationships, M. J. Kamlet, J. M. Aboud, R. W. Taft, 81 Prog. Phys. Organ. Chem. 485. Thus, Butyrolactone (Pi*=0.55, Beta=0.49, and Alpha=nil) is compared to Dimethylformamide (Pi*=0.88, Beta=0.69, and Alpha=nil) in the core tests. The results indicate that butyrolactone is less effective in removal of asphaltene, and reestablishment of effective permeability. Several other solvents are also evaluated, including acetone (Pi*=0.72, Beta=0.48, and Alpha=0.07), hexamethylphosphoramide (Pi* =0.87, Beta=1.05, Alpha= nil), nitrobenzene (Pi*= 1.01, Beta=0.39, and Alpha= nil), xylene (Pi*= Beta= nil, Alpha= nil). From the results of these tests, Hexamethylphosphoramide is equal to or better than Dimethylformamide which is better than the others listed.

These results indicate that solvents having Pi* values of 0.7 or above and Beta values above 0.6 would be effective solvents for use with AACP or NSI in accordance with the invention. It is also noted that hexamethylphosphoramide contains a tertiary amine moiety. Some solvents meeting criteria having Pi* values above 0.7 and Beta values above 0.6 are set forth in the following Table VIA.

TABLE VIA

| Solvent | π* | α | β |
|---|---|---|---|
| Dimethylacetamide | 0.88 | Nil | 0.76 |
| Dimethylformamide | 0.88 | Nil | 0.69 |
| N-Methylpyrrolidone | 0.92 | Nil | 0.77 |
| Dimethyl Sulfoxide | 1.00 | Nil | 0.76 |
| Triethyl phosphate | 0.72 | Nil | 0.77 |
| Hexamethyl phosphoramide | 0.87 | Nil | 1.05 |
| Pyridine | 0.87 | Nil | 0.64 | where:
α = Taft-Kamlet hydrogen-bond-donor solvent parameter
β = Taft-Kamlet hydrogen-bond-acceptor parameter
π* = Taft-Kamlet dipolarity-polarizability solvent parameter

EXAMPLE VII—DISPERSION RUNS—NMP, DMF, NSI MIXTURES

Dispersant fluid A described above is further investigated by placing asphaltene pellets in 15 ml of hexane, adding five percent by weight of individual components of dispersant fluid A (that is: NMP—N-methyl pyrrolidinone; DMF—dimethylformamide; and NSI— n-substituted imidazolines) and observing for 24 hours. The fluid is decanted after the 24 hour observation period. Use of hexane alone results in no physical disruption of the asphaltene pellet. Varying degrees of physical disruption are observed for each of the 5% DMF, NMP, and NSI fluids.

Filtration tests are also conducted on DMF, NMP, NSI and mixtures thereof. These tests are conducted by adding 10% individual and combined two- and three-component mixtures to a 10% asphaltene/90% xylene mixture. After 24 hours, suction filtration through a glass frit is performed on a 30 gram mixture, and the volume of filtrate obtained is measured versus time. The effectiveness of the additives is judged by volume of filtrate obtained after a period of two minutes. The lower the filtrate volume obtained, the less effective the additive since plugging of the frit is proportional to the amount of non-dispersed (precipitated) asphaltene. The three-component DMF-NMP-NSI blend shows a maximum effect of pellet disruption and asphaltene dispersion compared to the individual and two-component systems.

EXAMPLE VIII—CORE RUNS—NMP, DMF, NSI MIXTURES

Core testing is performed on various mixtures of DNF, NMP, and NSI. A Berea core of known porosity and permeability is prepared by flowing a brine solution through it to establish a water-wet condition, then xylene is flowed through it until a flowrate and pressure baseline is obtained. The core is attached to a high pressure liquid chromatography pump. A pressure transducer placed before the core inlet measures the pressure. A U.V. spectrometer measures asphaltene absorbance. After a baseline of absorbance at 450 nm, flowrate of 10 ml/min and pressure of 20 psi is achieved, a 75 ml mixture of 1% asphaltene in 99% xylene used to deposit asphaltenes on the core. Pressure increases, and the flowrate is reduced. After the asphaltene absorbance peaks and baseline xylene absorbance is achieved, a dispersant system is added. The pressure increases and an increase in asphaltene absorbance is observed. After the asphaltene absorbance peaks and a baseline xylene absorbance are achieved, the pressure and flow rates are measured.

The results indicate that one component or two component mixtures of DMF, NMP and NSI are not as effective as the three-component mixture in removing asphaltenes and restoring core permeability. After the three-component system removes asphaltenes, flow rate and pressure are observed to have returned to those of the core prior to asphaltene loading.

EXAMPLE IX—ASPHALTENE DISPERSANT—NMP, DMF, NSI MIXTURES

Effectiveness of asphaltene dispersant ability is conducted by placing a four gram asphaltene pellet in a 25 ml graduated cylinder with fifteen milliliters of n-hexane and treating by adding 5 ml of dispersant systems described below and the sample is observed for a period of 24 hours.

N-Substituted Imidazoline (NSI)

After 4 hours, a noticeable physical disruption of the pellet is observed, along with a substantial fluid penetration of the pellet as indicated by a measurable decrease in the volume of fluid. The fluid is highly colored by dissolved asphaltenes, and a considerable amount of sediment is observed in the bottom of the graduated cylinder. After 24 hours, the pellet is completely broken up and a smaller amount of sediment is observed.

N, N-Dimethyl Formamide (DMF) and N-Methyl Pyrrolidinone (NMP)

Each of the DMF sample and the NMP sample gives very little coloration to the fluid in the 4 hour sample, but opens large fissures in the pellet. After 24 hours, the pellet is broken into several large chunks, with a fair amount of sediment in the bottom of the graduate. The 24 hour sample also showed a fair amount of coloration. The physical disruption of the pellets indicated that DMF and NMP are effective solvents for physically disrupting asphaltenes but alone are relatively less effective than NSI as asphaltene dispersants.

NMP gives virtually the same results as DMF.

NMP+ NSI

A mixture of NMP and NSI gives about the same coloration in 4 hours than does NSI alone in 24 hours, and the amount of sediment is comparable. This indicates that NSI acts as a dispersant and that enhanced or synergistic effects are observed when NMP and NSI are combined.

DMF+ NSI

A mixture of DMF and NSI gives less coloration in four hours than does NSI alone in 24 hours; however, the amount of sediment is reduced considerably. This indicates that, as shown above, NSI acts as a dispersant and that enhanced or synergistic effects are observed when NMP and NSI are combined.

NMP+DMF+NSI

A mixture of NMP, DMF and NSI gives results comparable to the 24 hour sample of NSI alone in 4 hours, i.e., high coloration, low amount of sediment, and complete disruption of the pellet.

This example indicates a synergistic effect effected by the use of a combination of solvents (DMF and NMP) with NSI as the dispersant. While the exact theory of operation is not known, these effects are consistent with solvent theory. In solvent theory, "hole effects" are hypothesized to be operative, along with solvent sheaths. The DMF forms a smaller hole than the NMP because of its smaller size and less hindered structure. Thus, DMF is hypothesized to be closer to the surface of the asphaltene particle. As disruption by the DMF proceeds, NMP is capable of accepting the DMF disrupted asphaltene. Then, NSI suspension of the sheathed DMF-NMP-asphaltene particle can take place.

EXAMPLE X—COMPATIBILITY TESTS

Various compatibility tests are conducted by mixing in various proportions the systems I and J with various oils and brines. These runs indicate the dispersant systems I and J do not cause stable emulsions and are compatible with the oils tested.

From the above examples, it is shown that dispersant systems I and J are equally effective in dispersing asphaltenes under static conditions in hexane and more effective in aromatic hydrocarbon solvents such as xylene and toluene. The best results are obtained with toluene and dispersant system J.

In the tests with previous damaged core, improvements on the order of 25 and 83% in permeability of the core with treatments with dispersant system I alone are observed. In tests with new core, improvements in permeability of the core can be on the order of 1,000%.

According to a method aspect, the invention comprises introducing the invented asphaltene removal composition into contact with deposited asphaltenes and dispsering at least a portion of the asphaltenes. The method can be applied to asphaltene deposits wherever occurring in wells, pipelines, associated equipment, subterranean formations adjacent wells or adjacent perforated zones in wells and the like.

The asphaltene removal composition can be introduced as a liquid or as a gas enriched with invented composition vapors. The composition can be applied by spraying, pumping, pumping under pressure or any other effective means. The composition can be circulated in contact with deposited asphaltenes or can be introduced into contact and the well or other sites being treated can then be shut in, for example, for 4 or more hours, optionally 24 hours or more. The asphaltene removal composition can be introduced at ambient temperature or can be heated prior to introduction into contact with asphaltenes.

For example, to clean a formation in the vicinity of a well, fluids in the production tubing can first be displaced with xylene, followed by a solution of mutual solvent in xylene. Then, the invented composition can be placed in the formation in the vicinity of the well.

Subterranean formation adjacent a borehole can also be treated by forcing (squeezing) an effective asphalt dispersing amount of an invented composition into the formation using an effective pressure, releasing the pressure, and producing fluids from the well.

The invented composition can also be introduced into contact with formation which is substantially free of asphaltene deposits to inhibit asphaltene deposits.

Many other treating practices and procedures using the invented composition will be apparent to those skilled in the art from the description herein.

The invention described herein is effective and of significant value in removing asphaltene deposits from wells, subterranean formations adjacent wells, and from production equipment and from pipelines and generally from wherever asphaltene deposits are present and can be contacted with the invented composition.

What is claimed is:

1. A fluid composition for removing solid asphaltene deposits from wellbores, adjacent subterranean formations, and crude oil production equipment by forming a suspension of finely divided asphaltene particles in a liquid, which composition consists essentially of
   a. 1 to 50 liquid volume percent of component A selected from the group consisting of N-substituted imidazolines, alkyleneamine-fatty acid condensation products formed by reaction of one or more fatty acids having about 8 to about 32 carbon atoms and at least one alkylene polyamine of the formula $$H_2N(C_2H_4)_nH$$

where n is in a range of from about 1 to about 10, and admixtures thereof,
   b. 0.1 to 50 liquid volume percent of component B comprising a polar aprotic solvent that is an amide having a dielectric constant of at least about 23.5, and
   c. 0 to about 99 liquid volume percent of a carrier fluid comprising an aromatic solvent selected form the group consisting of benzene, toluene, xylene and admixtures thereof alone or in combination with one or more alcohol selected from the group consisting of methanol, isopropyl alcohol, capryl alcohol, ethylhexyl alcohol, and octyl alcohols.

2. The fluid composition for removing solid asphaltene deposits of claim 1 wherein the alkyleneamine-fatty acid condensation products are formed by reaction of one or more monocarboxylic fatty acids having about 8 to about 20 carbon atoms and at least one alkylene polyamine of the formula $$H_2N(C_2H_4NH)_nH$$

where n is in a range of from about 1 to about 5.

3. The fluid composition for removing solid asphaltene deposits of claim 2 wherein the alkylene polyamine is selected from the group consisting of ethylene diamine, diethylene triamine, triethylene tetramine, tetraethylene pentamine, and admixtures thereof.

4. The fluid composition for removing solid asphaltene deposits of claim 2 wherein the alkylene polyamine comprises diethylene triamine.

5. The fluid composition for removing solid asphaltene deposits of claim 1 wherein the amount of component A present is in a range from 1 to 15 liquid volume percent and component A comprises N-substituted imidazolines.

6. The fluid composition for removing solid asphaltene deposits of claim 1 wherein component B comprises one or more organic solvents characterized by having $\pi^*$ values in a range upward from about 0.7 and $\beta$ values in a range upward from about 0.6 where $\pi^*$= Taft-Kamlet dipolarity-polarizability solvent parameter, and $\beta$= Taft-Kamlet hydrogen-bond-acceptor parameter.

7. The fluid composition for removing solid asphaltene deposits of claim 6 wherein the amount of component A present is in a range from 1 to 15 liquid volume percent and component A comprises N-substituted imidazolines.

8. The fluid composition of claim 6 wherein the one or more organic solvents are further characterized by α values of at most about 0.07, wherein α= Taft-Kamlet hydrogen-bond-donor parameter.

9. The fluid composition of claim 8 wherein the one or more organic solvents are further characterized by α values of zero.

10. The fluid composition for removing solid asphaltene deposits of claim 1 wherein component B comprises one or more organic solvent characterized by having a tertiary amine moiety.

11. The fluid composition for removing solid asphaltene deposits of claim 10 wherein the amount of component A present is in a range from 1 to 15 liquid volume percent and component A comprises N-substituted imidazolines.

12. The fluid composition for removing solids asphaltene deposits of claim 1 wherein component B comprises a solvent selected from the group consisting of methyl formamide, dimethyl formamide, diethyl formamide, dipropyl formamide, butyrolactam, N-methyl-2-pyrrolidinone, hexamethyl phosphoramide, and admixtures thereof.

13. The fluid composition for removing solid asphaltene deposits of claim 12 wherein the amount of component A present is in a range from 1 to 15 liquid volume percent and component A comprises N-substituted imidazolines.

14. The fluid composition for removing solid asphaltene deposits of claim 1 wherein the amount of component B present is in a range from 0.1 to 15 liquid volume percent and component B comprises N-methyl-2-pyrrolidinone and a second solvent selected from the group consisting of dimethyl formamide, hexamethyl phosphoramide, and admixtures thereof.

15. The fluid composition for removing solid asphaltene deposits of claim 14 wherein the carrier fluid comprises an aromatic solvent selected from the group consisting of toluene, xylene and admixtures thereof alone or in combination one or more alcohol selected from the group consisting of methanol, isopropyl alcohol, and octyl alcohols.

16. The fluid composition for removing solid asphaltene deposits of claim 15 wherein the amount of component A present is in a range from 1 to 15 liquid volume percent and component A comprises N-substituted imidazolines.

17. The fluid composition for removing solid asphaltene deposits of claim 14 wherein the alkyleneamine-fatty acid condensation products are formed by reaction of one or more monocarboxylic fatty acids having about 8 to about 20 carbon atoms and at least one alkylene polyamine of the formula $$H_2N(C_2H_4NH)_nH$$

where n is in a range of from about 1 to about 5.

18. The fluid composition for removing solid asphaltene deposits of claim 17 wherein the carrier fluid comprises an aromatic solvent selected from the group consisting of toluene, xylene and admixtures thereof alone or in combination one or more alcohol selected from the group consisting of methanol, isopropyl alcohol, and octyl alcohols.

19. The fluid composition for removing solid asphaltene deposits of claim 17 wherein the alkylene polyamine is selected from the group consisting of ethylene diamine, diethylene triamine, triethylene tetramine, tetraethylene pentamine, and admixtures thereof.

20. The fluid composition for removing solid asphaltene deposits of claim 19 wherein the carrier fluid comprises an aromatic solvent selected from the group consisting of toluene, xylene and admixtures thereof alone or in combination one or more alcohol selected from the group consisting of methanol, isopropyl alcohol, and octyl alcohols.

21. The fluid composition for removing solid asphaltene deposits of claim 17 wherein the alkylene polyamine is comprises diethylene triamine.

22. The fluid composition for removing solid asphaltene deposits of claim 21 wherein the carrier fluid comprises an aromatic solvent selected from the group consisting of toluene, xylene and admixtures thereof alone or in combination one or more alcohol selected from the group consisting of methanol, isopropyl alcohol, and octyl alcohols.

23. The fluid composition for removing solid asphaltene deposits of claim 14 wherein the amount of component A present is in a range from 1 to 15 liquid volume percent and component A comprises N-substituted imidazolines.

24. The fluid composition for removing solid asphaltene deposits of claim 23 wherein the carrier fluid consists essentially of an aromatic solvent selected from the group consisting of toluene, xylene and admixtures thereof.

25. The fluid composition of claim 1 wherein component B consists essentially of the polar aprotic solvent, which polar aprotic solvent may be a mixture of organic solvents, and the carrier fluid consists essentially of said aromatic solvents, alone or in combination with one or more alcohols.

26. The fluid composition of claim 1 wherein component B consists essentially of the aromatic solvent and the carrier fluid are consists essentially of the aromatic solvent.

27. The fluid composition of claim 1 wherein the polar aprotic solvent is a tertiary amide.

28. A fluid composition for removing solid asphaltene deposits by forming a suspension of finely divided asphaltene particles in a liquid, which composition consists essentially of
   a. 1 to 15 liquid volume percent of component A selected form the group consisting of N-substituted imidazolines, alkyleneamine-fatty acid condensation products formed by reaction of one or more monocarboxylic fatty acids having about 8 to about 20 carbon atoms and at least one alkylene polyamine selected from the group consisting of ethylenediamine, diethylenetriamine, triethylenetetramine, tetraethylene pentamine, and admixtures thereof;
   b. 0.1 to 15 liquid volume percent of component B comprising N-methyl-2-pyrrolidinone and one or more organic solvents characterized by having $\pi^*$ values in a range upward from about 0.7 to about 1 or above and $\beta$ values a range upward from about 0.6, where
   $\pi$= Taft-Kamlet dipolarity-polarizability solvent parameter, and
   $\beta$—Taft-Kamlet hydrogen-bond-acceptor parameter, and
   c. a carrier fluid comprising an organic solvent selected from the group consisting of benzene, toluene, xylene and admixtures thereof alone or in combination one or more alcohol selected from the group consisting of methanol, isopropyl alcohol, capryl alcohol, ethylhexyl alcohol, and octyl alcohols.

29. The fluid composition for removing solid asphaltene deposits of claim 28 wherein the amount of component A present is in a range from 1 to 10 liquid volume percent and component A comprises N-substituted imidazolines and wherein the amount of component B present is in a range from 0.2 to 10 liquid volume percent and component B comprises N-methyl-2-pyrrolidinone and a solvent selected from the group consisting of methyl formamide, dimethyl formamide, diethyl formamide, dipropyl formamide, butyrolactam, hexamethyl phosphoramide, and admixtures thereof.

30. The fluid composition for removing solid asphaltene deposits of claim 29 wherein the carrier fluid comprises an aromatic solvent selected from the group consisting of toluene, xylene and admixtures thereof alone or in combination one or more alcohol selected from the group consisting of methanol, isopropyl alcohol, and octyl alcohols.

31. The fluid composition for removing solid asphaltene deposits of claim 28 wherein the amount of component A present is in a range from 1 to 10 liquid volume percent, the alkylene polyamine comprises diethylene triamine, and wherein the amount of component B present is in a range from 0.2 to 10 liquid volume percent and component B comprises N-methyl-2-pyrrolidinone and one or more solvent selected from the group consisting of dimethyl formamide and hexamethyl phosphoramide.

32. The fluid composition for removing solid asphaltene deposits of claim 31 wherein the carrier fluid comprises an aromatic solvent selected from the group consisting of toluene, xylene and admixtures thereof.

33. The fluid composition of claim 28 wherein the one or more organic solvents are further characterized by $\alpha$ values of at most about 0.07, wherein $\alpha$= Taft-Kamlet hydrogen-bond-donor parameter.

34. The fluid composition of claim 33 wherein the one or more organic solvents are further characterized by $\alpha$ values of zero.

35. The fluid composition of claim 28 wherein component B consists essentially of N-methyl-2-pyrrolidone and the one or more organic solvents and the carrier fluid consists essentially of the organic solvent alone or in combination with the one or more alcohols.

36. An asphaltene removal composition consisting of 1 to 5 liquid volume percent of alkyleneamine condensation reaction product with $C_8$ to $C_{20}$ fatty acid, 0.1 to 2 liquid volume percent of dimethyl formamide, 0.2 to 2 liquid volume percent of n-methyl-2-pyrrolidinone, in a carrier fluid comprising an aromatic solvent selected from the group consisting of toluene and xylene.

37. The asphaltene removal composition of claim 18 wherein the alkyleneamine is an alkylene polyamine selected from the group of ethylene diamine, diethylene triamine, triethylene tetramine and tetraethylene pentamine.

* * * * *